June 16, 1942.    D. O. TRANBARGER    2,286,520
GARBAGE DISPOSER
Filed April 28, 1941

INVENTOR
Dale. O. Tranbarger.
BY
R. P. Martin.
ATTORNEY

Patented June 16, 1942

2,286,520

UNITED STATES PATENT OFFICE 2,286,520

GARBAGE DISPOSER

Dale O. Tranbarger, Seattle, Wash.

Application April 28, 1941, Serial No. 390,787

1 Claim. (Cl. 83—6)

This invention relates to improvements in dishwasher and garbage disposer and has for its object the provision of means whereby garbage may be reduced to a fine pulpy condition and discharged into a sewer.

Another object of the invention is by use of an electric motor connected to a propeller to circulate water through a sink to wash dishes. The invention is illustrated in the accompanying drawing and will be hereinafter fully described and particularly defined.

Figures 1, 2, 3:
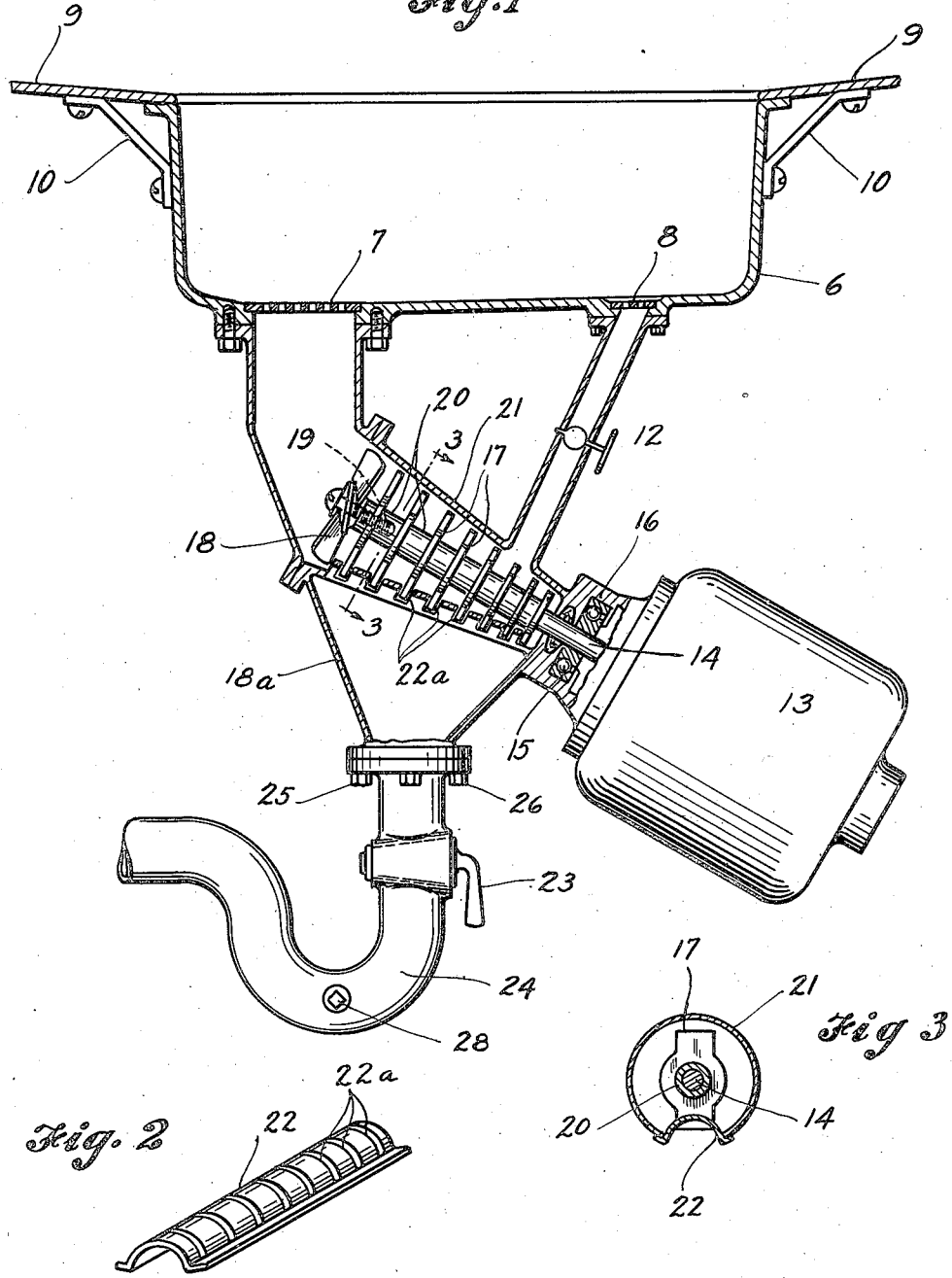
Figure 1 is an elevation of my invention partly in section.
Figure 2 is a perspective view of an elongated semi-circular cutting block of hard material to receive cutting blades and an outlet for garbage.
Figure 3 is a section taken on line 3—3 of Fig. 1, disclosing the cutting blade and semicircle block and motor shaft.

In carrying out the present invention, there is provided a sink 6, provided with two outlets 7, 8, and a drainboard 9, adjacent braces 10—10. Outlet 8 is provided with valve 12, which is to be opened for circulation when the dish washing is in operation. Numeral 13 is an electric motor which is provided with a long motor shaft 14, and ball bearings 15, and closure 16, and eight cutting blades indicated at 17. At the end of shaft 14 is a propeller 18, threaded at 19 on shaft 14. Between each blade is a tubular sleeve 20; each tube being a little shorter between the blades as they get closer to the motor end. Numeral 21 indicates the conical housing for the cutting blades 17 and semi-circle cutting block 22 to be welded thereto.

Numeral 23 indicates the lower valve on nozzle 24, which is bolted to hopper 18a, by bolts 25—26. Lower end of trap 24 is connected to a sewer and is provided with a suitable clean-out plug, indicated at 28, and water may accompany the garbage to aid in pulverization.

In the operation, the garbage comes in through outlet 7, and as the cutting blades 17 in the garbage disposer are set at an acute angle, which is sufficient angle to allow gravity to lower the garbage and moisture to the blades, which in turn will reduce the size of the garbage so it may be forced out through the slots 22a, with help of water, in Figure 2.

When the dishes are to be washed, valve 23 is closed and valve 12 is opened; then the motor is started to rotate propeller 19 to force the water down passage 7, and up in passage 8, causing a circulation of water and moisture in sink 6, to clean dishes when covers 7 and 8 are removed.

What I claim and desire to secure by Letters Patent is:

In combination, a sink, a drain outlet in the bottom of said sink, a conduit leading from said outlet to a sewer trap beneath the sink, said conduit having an enlarged portion therein including an inclined concave wall of the conduit and a slotted convex plate covering the discharge opening from said conduit, the said concave wall of the conduit and the convex plate forming a substantially conical grinding chamber, the axis of which is inclined toward its apex, an electric motor attached to the conduit at the lower end of the grinding chamber and having its shaft extending co-axially upwardly through the conical grinding chamber, said shaft supporting, for rotation therewith, a series of flat generally rectangular shaped cutting blades of graduated sizes and having graduated spacing, the large blades being located adjacent the large end of the conical grinding chamber and spaced the greater distance apart and the small blades being adjacent the apex of such chamber and spaced closer together, the ends of said blades passing through the slots in said convex plate to cut and force garbage through said plate and into the discharge end of the conduit above the trap.

DALE O. TRANBARGER.